W. G. FRANKLIN.
Gate-Hinges.

No. 138,081. Patented April 22, 1873.

Witnesses:
A. W. Almquist
C. Sedquiet

Inventor:
W. G. Franklin
per [attorney signature]
Attorneys.

UNITED STATES PATENT OFFICE.

WILLARD G. FRANKLIN, OF SHELBINA, MISSOURI.

IMPROVEMENT IN GATE-HINGES.

Specification forming part of Letters Patent No. 138,081, dated April 22, 1873; application filed November 30, 1872.

*To all whom it may concern:*

Figure 1:
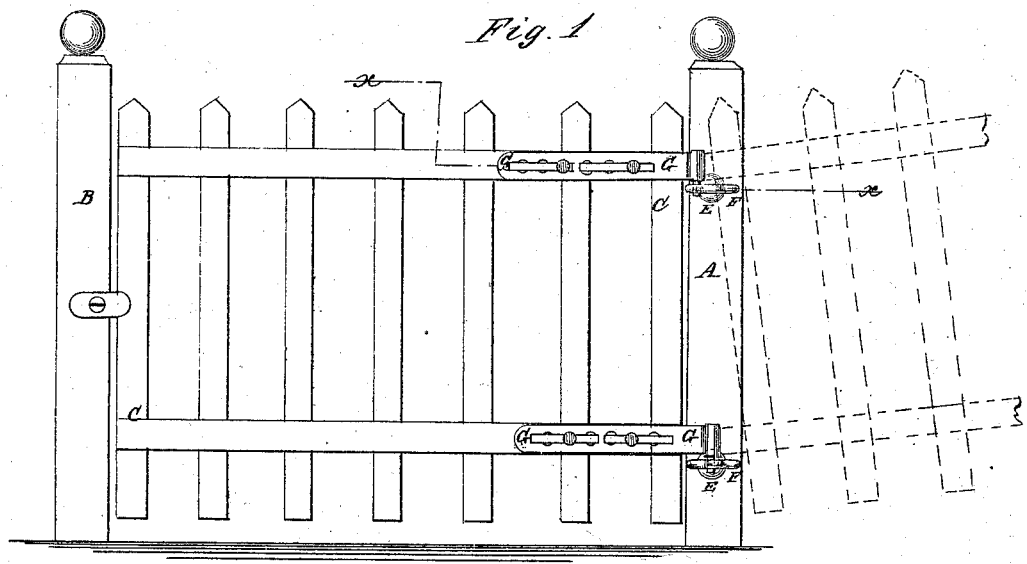
Figure 2:
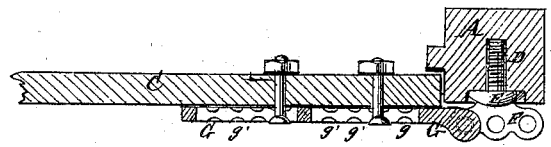
Figure 3:
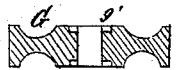
Figure 4:

Be it known that I, WILLARD G. FRANKLIN, of Shelbina, in the county of Shelby and State of Missouri, have invented a new and useful Improvement in Gate-Hinge, of which the following is a specification:

Figure 1 is a side view of a gate to which my improved hinges have been applied, and showing in dotted lines the position of the gate when opened. Fig. 2 is a detail section of the same taken through the line $x\,x$, Fig. 1. Figs. 3 and 4 are detail cross-sections of the hinge.

Similar letters of reference indicate corresponding parts.

My invention has for its object to furnish improved gate-hinges, which shall be so constructed that the gate may be adjusted to swing level or to incline upward as it swings back, and which will allow the forward end of the gate to be raised when desired to allow hogs or other small animals to pass through; and consists in the post piece having a screw-shank, a shoulder-plate, and a three-hole eye-plate, and the gate piece having slots and semicircular notches formed in it, as hereinafter more fully described.

A represents the rear or hinge post, B represents the front or latch-post, and C represents the gate, about the construction of which parts there is nothing new. D represents the shanks of the post piece of the hinge, upon which is cut a screw-thread to adapt it to be screwed into the post. E is a plate or flange formed upon the post piece, and which is designed to be let into a recess in the post A, or which may rest against the side of said post. The projecting end or eye plate F of the post piece is made wide, and has three holes formed in it to receive the hook or pivot of the gate piece G. The gate piece G is made with two long slots in it in line with each other, as shown in Figs. 1 and 2, to receive the bolts by which said pieces G are secured to the gate, so that by loosening the said bolts the pieces G may be adjusted to cause the gate to shut squarely. The pieces G have concaves or semicircular notches, $g'$, formed in them upon both sides of the slots to receive the bolt-heads, so that the pieces G cannot slip upon the bolts. The same thing may be accomplished by sharp transverse edges formed across the sides of the pieces G, but I prefer the first construction, as it does not mar or mark the gate, however often it may be adjusted. Both sides of the pieces G are made alike, so that they may be attached to either side of the gate, as may be required.

By this construction by pivoting the upper piece G in the forward hole of the piece D, and pivoting the lower piece G in the central or rear hole of the piece D, and adjusting the pieces G upon the gate so that the gate will shut squarely, the forward end of the gate will rise as it is swung open so as to pass over snow or other obstructions. If, now, without changing the adjustment of the pieces G upon the gate, the upper pivot be inserted in one of the rear holes of the piece D and the pivot of the lower hinge be inserted in the forward hole of its piece D, the forward end of the gate will be raised when shut, so that hogs or other small animals may pass beneath it freely.

Having thus described my invention, I claim as new and desire to secure by Letters Patent—

A gate-hinge, consisting of screw-shank D, shoulder-plate E, eye-plate F having a series of holes, and adjustable gate-piece G, combined and applicable, as and for the purpose described.

WILLARD GREEN FRANKLIN.

Witnesses:
 WILLIAM B. DAVIS,
 WALLACE DAVIS.